United States Patent Office 2,744,377
Patented May 8, 1956

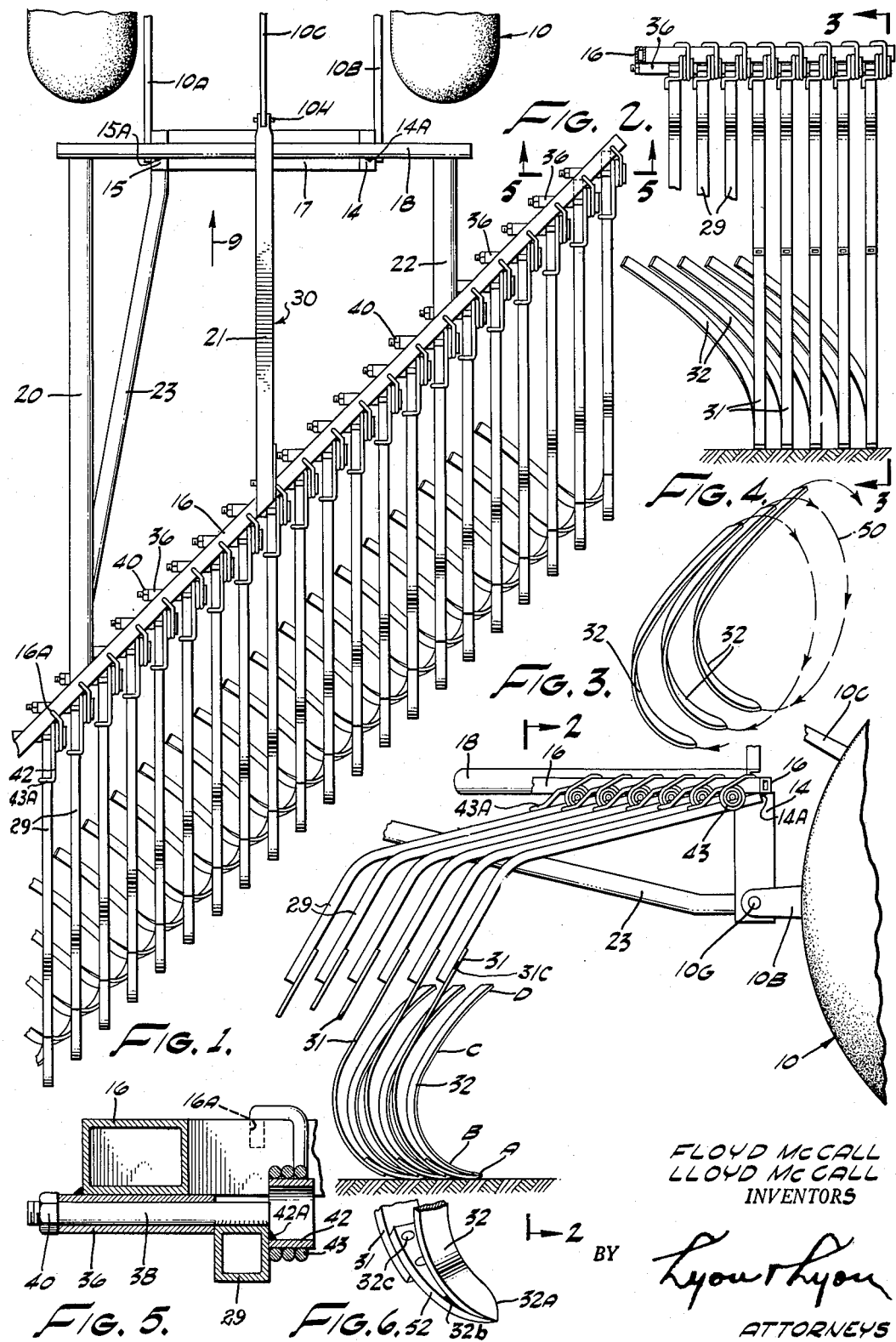

2,744,377

SIDE DELIVERY RAKE

Floyd McCall and Lloyd McCall, Romoland, Calif.

Application September 21, 1953, Serial No. 381,377

9 Claims. (Cl. 56—376)

The present invention relates to improvements in rakes for gathering or collecting hay and the like, and constitutes an improvement in that type of rake described and claimed in our co-pending application, Serial Number 163,522, filed May 22, 1950, now United States Letters Patent 2,667,730, issued Feb. 2, 1954.

It is desirable to provide a device or machine of this character which forms the gathered hay into loose stacks through which air is allowed to circulate during the period while such stacks remain in the field, to thereby obtain a better grade of hay.

The present invention contemplates the production of harvested hay in the form of loose tubes or rolls, such tubes or rolls being produced by causing the hay to travel in a spiral when and as it is being gathered by the machine, using an arrangement for that purpose which is simpler than that illustrated in the above mentioned patent, in that the arrangement may be mounted as a unit on conventional tractors having a conventional three-point suspension, and without requiring the use of ground-engaging wheels.

It is therefore, an object of the present invention to provide an improved machine of this character which may be mounted on existing tractors having three-point suspensions without the machine or device requiring ground-engaging wheels.

Another object of the present invention is to provide an improved machine of this character in which the tines or rake teeth have a compound curvature, each of which lies generally on a spiral extending in echelon with respect to the forward movement of the vehicle upon which such tines or rake teeth are mounted, the machine in this instance being characterized by its improved construction.

It is understood that the term "compound curvature" as used herein in characterizing the structural features of the rake teeth or tines, is intended to mean a tine or rake which has a curvature extending not only in the direction of movement of the vehicle upon which it is mounted, but also has curvature in a direction transverse or lateral to such direction of movement.

A further object of the present invention is to provide an improved raking device or machine of this character having a plurality of tines supported in a novel manner with compound curvature for the purposes of imparting a rolling movement to the hay when and as it is gathered to form the same into a loose roll or tube.

Another object of the present invention is to provide an improved rake structure of this character wherein the tines or rake teeth are mounted in a novel manner, on a supporting beam which extends in echelon with respect to the direction of vehicle movement.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a plan view of a device mounted on a tractor and embodies features of the present invention.

Figure 2 is a view taken generally in the direction indicated by the arrows 2-2 in Figure 3 with a portion broken away.

Figure 3 is a sectional view taken in the general direction indicated by the arrows 3-3 in Figure 2.

Figure 4 serves to illustrate the constant curvature of the tines which lie generally on a spiral extending in echelon in the direction of movement of the vehicle.

Figure 5 is a sectional view, in enlarged form, taken substantially on the line 5-5 of Figure 1.

Figure 6 shows, on an enlarged scale, a portion of the rake tine closest to the ground.

The device or machine shown in Figure 1 is intended to be drawn in the direction indicated by the arrow 9 by a powered vehicle such as a tractor 10 having a conventional three-point suspension 30, such three-point suspension comprising the lower arms 10A and 10B and the upper movable arm 10C. This suspension is referred to as a three-point suspension since the rake is attached to the same at three points, namely at the ends of the three arms 10A and 10C. The machine or device is pivoted on the tractor arms 10A and 10B using pivot pins as exemplified by the pivot pin 10G in Figure 3. The upper end of arm 10C is likewise pin connected to a portion of the machine, using for that purpose the pin 10H indicated in Figure 1.

The tractor 10, it is understood, includes conventional means whereby the free end of the arm 10C may be raised or lowered to correspondingly raise or lower the device or machine attached thereto and which is now described in detail.

The frame of the rake includes a pair of vertically extending frame members 14 and 15 which have their lower ends interconnected by the horizontal frame member 17 which has opposing ends thereof welded to the upstanding frame members 14 and 15. The upper ends of the frame members 14 and 15 have welded thereto at 14A and 15A respectively, the elongated horizontal frame member 18, such frame member 18 being welded to the upper ends of the frame members 14 and 15 and extends beyond such frame members 14 and 15 as shown in Figure 1.

An echelon extending support beam 16 is secured to the frame by rearwardly extending frame members 20, 21 and 22, one end of each of the frame members 20, 21 and 22 being welded to the cross member 18 and the other ends of the frame members 20, 21 and 22 each being welded to different spaced regions of the echelon extending support beam 16. Additional bracing of the support beam 16 is provided by the brace 23 having one of its ends welded to the upstanding frame member 15 and the other one of its ends welded to the rearward-most portion of frame member 20. The forward-most end of the frame member 21 is pin connected to the free end of the tractor arm 10C by means of the aforementioned pin 10H.

It is clear from the structure thus far described, that the frame, including the echelon support beam 16, is pivotally secured on the tractor arms 10A and 10B and may be pivoted about the axis of pin 10G upon movement of the tractor arm 10C. No supporting wheels are required for the frame other than, of course, the wheels of the tractor itself.

The rake assembly, which is considered to include the support beam 16 as shown in Figure 1, extends in echelon with respect to the direction 9.

Each of the rake elements comprises a rake bar 29 having its upper end pivotally mounted on the support beam 16, by means described presently, a flexible time supporting strap 31 welded at 31C to the lower end of the rake bar 29 and a tine 32 preferably releasably secured to the lower end of the flexible strap 31 as illustrated in Figure 6. As shown in Figure 6, the lower end of tine 32 is generally pointed.

The rake bar 29 is pivotally mounted on the support beam 16 as illustrated in Figure 5. For that purpose the support beam 16 has welded thereto the sleeve 36 in which the pin or bolt 38 is free to rotate. The pin 38 has welded thereto the rake bar 29 which is engageable with one end of the sleeve 36 to limit longitudinal movement of the pin 38 in one direction, longitudinal movement of the pin 38 in the other direction being limited by suitable means such as, for example, the nut 40 threaded on pin 38. The circular element 42 is welded at 42A to the rake bar 29 and a prestressed torque spring 43 is wound around such circular element 42. One end of the torque spring 43 is engageable with an apertured portion 16A in the support beam 16, the other end of the torque spring 43 being bent at 43A around the rake bar 29 as illustrated in Figure 1, so as to tend to rotate or pivot the rake bar 29 downwardly in the direction of the ground, such movement being limited by the upper end of the rake bar 29 engaging the underside of the support beam 16 as illustrated in Figure 3.

As indicated previously, the tines 32 are connected to the rake bar 29 by a corresponding flexible strap 31 which serves to impart some desirable resiliency to the tine mounting. Additional resiliency, of course, is imparted as a result of the manner in which the torque springs 43 are disposed. The resilient strap 31 imparts sufficient resiliency in the mounting to allow the tines to move slightly in response to small regulative forces exerted on the tines without causing the rake bar 29 to move out of engagement with the support beam 16. However, when the tine encounters relatively large resistance as, for example by striking a buried rock, the rake bar 29 moves relative to the support beam 16 against the action of the prestressed torque spring 43.

Each of the tines or rake teeth 32 has a compound curvature as defined above, such tines 32 being formed of flat metal strips curved both in the direction of movement and in a direction lateral or transverse to such direction of movement and such that each of such tines lies on a spiral or uniform pitch as illustrated by the spiral 50 shown in diagrammatic form in Figure 4.

Each of these tines 32 may be affixed as, for example, by welding, to the lower ends of the resilient strap 31, or as illustrated in Figure 6, the lower end of tine 32 is welded at 32B to an upwardly extending base member 52 which is, for replacement purposes releasably secured to the lower end of the strap 31 by convenient fastening means, as for instance, by bolts or rivets 32C.

It is thus observed that the tines 32 are supported at their lower ends as a cantilever on the lower ends of the resilient straps 31; and, in turn, the straps 31 are supported as a cantilever or arm for movement about the axis of pin 38. The lower ends of the tines 32 are maintained and adjusted a predetermined distance above the ground by a conventional mechanism on the tractor which serves to control the position of the front end of arm 10C.

Focusing attention to the specific construction of the tines 32 in relationship to Figures 1, 2, 3, 4 and 6, it is observed that the lower ends of the tines are tapered at 32A and are contiguous with the tapered ends of the bars 52, so that a pointed structure initially engages the hay lying on the ground. As seen in Figure 3, the amount of curvature in the range A, B is relatively small, such curvature increasing slightly in the range B, C and then such curvature decreases in range C, D, such curvature being in the direction of movement of the vehicle. It is observed further that the tines 32 are each curved in a direction transverse or lateral to such direction of movement as shown in the front elevation view in Figures 1 and 2. Such curvature along such mutually perpendicular axes is referred to herein as a compound curvature as defined hereinabove. The drawings show an equal spacing between adjacent tines 32; while such structure is preferred, it is understood that it is within the province of the present invention to make such spacing non-uniform, while maintaining the compound curvature in each one of the tines. In this respect it may be desirable to provide each one of such tines 32 with a different degree of compound curvature such that all the tines lie generally on a continuous spiral (such as the spiral 50).

By providing the tines with compound curvature and disposing them in echelon, a lowering movement is imparted to the gathered hay, so that the hay in its echelon movement, while thus lowering, forms itself into a roll or half tube. The production of such roll or tube is desirable, since it permits circulation of air through the hay while lying on the field to aid in drying of the hay mass.

In general the "tightness" or diameter of the roll may be controlled by imparting different degrees of compound curvature to the individual tines. Such "tightness" is also effected to a certain extent by the distance of spiral separation of the tines 32 and, in general, the closer the spacing the smaller the amount of curvature required in each tine. Also, assuming fixed spacing, as shown herein, the greater the compound curvature of the tines the looser the resulting hay roll. The above generalities are true and are generally independent of the speed of the vehicle within, of course, the normal speed range of the vehicle.

Although it is possible to obtain some of the results of the present invention by making the tines 32 of wire, preferably such tines are made of flat metal stock as shown in the drawings to provide an extended area upon which the hay may rest; however, the flat stock should not be too wide in relationship to their spacing, otherwise some hay may bind in the spaces between the tines or rocks and stones may become lodged between adjacent tines.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a side delivery hay raking device of the character described, a supporting frame, a plurality of individually spaced tines mounted on said frame in a line extending at an angle to the direction of movement of said device, each one of said tines having a compound curvature, lying generally on a continuous spiral and having the lower extreme thereof making an acute angle with the plane of the ground and spaced immediately above the ground to rake hay which lies on the ground, and a plurality of flat, resilient elements interconnected between said frame and corresponding tines and providing the sole support for said tines.

2. In a side delivery hay raking device of the character described for mounting on a tractor, a supporting frame, a plurality of individually spaced tines mounted on said frame in a line extending at an angle in the direction of movement of said device, each one of said tines having a compound curvature lying generally on a continuous spiral and having each lower extreme thereof making an acute angle with the plane of the ground and spaced immediately above the ground to rake hay which lies on the ground, said frame including means at the forward end of the same for pivotal movement on said tractor intended to support and move said frame.

3. In a side delivery hay raking device of the character described for mounting on a tractor, a supporting frame, a plurality of individually spaced tines mounted on said frame in a line extending at an angle to the direction of movement of said device, each one of said tines having a compound curvature lying generally on a continuous spiral and having the lower extreme thereof making an acute angle with the plane of the ground and spaced immediately above the ground to rake hay which lies on the ground, a rake bar, means pivotally mounting said rake bar on said frame, spring means acting between said bar and said frame to urge said bar in the direction of the ground, said bar and frame cooperating to limit movement of said bar by said spring, a resilient strap having one of its ends connected to said bar and the other one of its ends connected to a corresponding tine and providing the sole means of support for said tine.

4. In a side delivery hay raking device of the character described, a supporting frame, and a plurality of individual spaced tines mounted on said frame in a line extending at an angle to the direction of movement of said device, each one of said tines having a compound curvature, lying generally on a continuous spiral and having the lower extremity thereof making an acute angle with the plane of the ground and spaced immediately above the ground to rake hay which lies on the ground, said supporting frame having a three-point suspension system adapting the same for mounting on said tractor.

5. A side delivery hay raking vehicle of the character described having a chassis, a plurality of tines each mounted on said chassis in a line extending in echelon with respect to the direction of forward movement of said vehicle, each of said tines having a compound curvature and lying generally on a continuous spiral and having the lower extremity thereof making an acute angle with the plane of the ground and spaced immediately above the ground to rake hay which lies on the ground, a resilient element for each tine each of said tines being supported on the lower end of a corresponding resilient element, the upper end of said resilient element being attached to said chassis.

6. In a side delivery hay raking device of the character described for mounting on a vehicle chassis, a frame adapted to be moved in raised position above the ground, a plurality of tines each mounted on said frame in a line extending in echelon with respect to the direction of movement of said frame, each of said tines having a compound curvature and lying generally on a continuous spiral and having the lower extremity thereof making an acute angle with the plane of the ground and spaced immediately above the ground to rake hay which lies on the ground, said frame having a three-point suspension system adapting the same for mounting on said chassis, a resilient element for each tine each of said tines being supported on the lower end of a corresponding resilient element, the upper end of said resilient element being attached to said frame.

7. In a side delivery hay raking device of the character described for mounting on a vehicle chassis, a supporting frame, a plurality of supporting bars each extending downwardly from said frame, means pivotally mounting each of said supporting bars on said frame near their upper ends, a plurality of tines each extending generally vertically and each attached at their lower ends to the lower ends of the corresponding supporting bars, the forward lower ends of said bars being generally pointed, and spring means disposed and acting between said supporting frame and said supporting bars tending to move the supporting bars closer to the ground, said frame having a three-point suspension system adapting the same for mounting on a tractor, a resilient element for each tine each of said tines being supported on the lower end of a corresponding resilient element, the upper end of said resilient element being attached to said frame.

8. A hay raking device as set forth in claim 1 in which each one of said tines comprises a cantilever supported element which is connected at its lower end to a corresponding one of said resilient elements, the free end of each element extending upwardly.

9. A hay raking device as set forth in claim 4 in which each one of said tines comprises a cantilever supported element and means supporting the lower end of each tine on said frame, the free end of said element extending upwardly.

References Cited in the file of this patent

UNITED STATES PATENTS

| | | |
|---|---|---|
| 983,894 | Halve | Feb. 14, 1911 |
| 2,603,934 | Sinnett | July 22, 1952 |
| 2,634,572 | Collins | Apr. 14, 1953 |
| 2,667,730 | McCall et al. | Feb. 2, 1954 |